US012230295B2

(12) United States Patent
Tang

(10) Patent No.: US 12,230,295 B2
(45) Date of Patent: Feb. 18, 2025

(54) VIDEO PROCESSING METHOD AND APPARATUS

(71) Applicant: SHANGHAI BILIBILI TECHNOLOGY CO., LTD., Shanghai (CN)

(72) Inventor: Junxing Tang, Shanghai (CN)

(73) Assignee: SHANGHAI BILIBILI TECHNOLOGY CO., LTD., Shanghai (CN)

(*) Notice: Subject to any disclaimer, the term of this patent is extended or adjusted under 35 U.S.C. 154(b) by 17 days.

(21) Appl. No.: 18/037,750

(22) PCT Filed: Sep. 23, 2021

(86) PCT No.: PCT/CN2021/119991
§ 371 (c)(1),
(2) Date: May 18, 2023

(87) PCT Pub. No.: WO2022/105419
PCT Pub. Date: May 27, 2022

(65) Prior Publication Data
US 2024/0013811 A1 Jan. 11, 2024

(30) Foreign Application Priority Data
Nov. 19, 2020 (CN) .......................... 202011302351.X

(51) Int. Cl.
G11B 27/34 (2006.01)
G06F 16/74 (2019.01)
(Continued)

(52) U.S. Cl.
CPC ............. G11B 27/34 (2013.01); G06V 20/46 (2022.01); H04N 19/167 (2014.11); H04N 19/172 (2014.11)

(58) Field of Classification Search
None
See application file for complete search history.

(56) References Cited

U.S. PATENT DOCUMENTS

2014/0090001 A1* 3/2014 Das .................... H04N 21/4725
725/112
2018/0131976 A1* 5/2018 Zabelin ................ H04N 21/812
(Continued)

FOREIGN PATENT DOCUMENTS

CN 103686454 A 3/2014
CN 103702222 A 4/2014
(Continued)

OTHER PUBLICATIONS

International Patent Application No. PCT/CN2021/119991; Int'l Search Report; dated Dec. 8, 2021; 3 pages.

Primary Examiner — Hung Q Dang
(74) Attorney, Agent, or Firm — BakerHostetler

(57) ABSTRACT

The present application provides a video processing method and apparatus. The video processing method includes: obtaining a video to be processed; decoding the video to obtain a set of target video frames, wherein the set of target video frames comprise a target recognition image; determining video position information indicating positions of the set of target video frames in the video, image position information indicating positions of the target recognition image in the set of target video frames, and a target link corresponding to the target recognition image; and storing the video position information, the image position information, the target link, and a corresponding relationship among them, and binding the same to the video. The video processing method provided in the present application facilitates a user in quickly jumping to a target link, simplifies complicated processes, and improves user experience.

20 Claims, 4 Drawing Sheets

(51) Int. Cl.
*G06F 16/78* (2019.01)
*G06V 20/40* (2022.01)
*H04N 19/167* (2014.01)
*H04N 19/172* (2014.01)

(56) References Cited

U.S. PATENT DOCUMENTS

2019/0026617 A1    1/2019  Glaser
2020/0322677 A1*  10/2020  Kovacs .............. H04N 21/6582

FOREIGN PATENT DOCUMENTS

| CN | 106937176 A | 7/2017 |
| CN | 109769133 A | 5/2019 |
| CN | 109819340 A | 5/2019 |
| CN | 110399574 A | 11/2019 |
| CN | 111954078 A | 11/2020 |
| CN | 112418058 A | 2/2021 |

\* cited by examiner

VIDEO PROCESSING METHOD AND APPARATUS

CROSS-REFERENCE TO RELATED APPLICATIONS

The present application is the U.S. National Stage of International Application No. PCT/CN2021/119991, filed on Sep. 23, 2021, which claims priority to Chinese Patent Application No. 202011302351. X, filed with the China National Intellectual Property Administration on Nov. 19, 2020, and entitled "VIDEO PROCESSING METHOD AND APPARATUS", both of which are incorporated herein by reference in their entireties.

TECHNICAL FIELD

The present application relates to the field of Internet technologies, and in particular, to a video processing method. The present application further relates to a video processing apparatus, a computing device, a computer-readable storage medium, and a computer program product.

BACKGROUND ART

As Internet technologies develop, diversified videos have been developed from simple movies, TV shows, etc., and more and more self-produced videos are available to the public.

A video uploader may upload a self-produced video via a video website. If the video uploader wants to share some content with the public through the video, he/she may usually choose methods of embedding a two-dimensional code, a bar code, a mini program code, and a QR code in the video, and indicating a link address of the content to be shared in descriptive information outside the video. If a user wants to watch the content shared by the video uploader in real-time during watching of the video, the user accesses the content by means of scanning and recognizing the code with another terminal device, or taking a screenshot and then recognizing the screenshot with a mobile phone, which causes inconvenience for operations. In addition, the means of clicking on the link address in the descriptive information outside the video requires the user to exit the video, and in the case of a large number of link addresses, the user cannot quickly and accurately recognize desired content, which is also time-consuming and labor-intensive, resulting in the loss of users.

SUMMARY OF THE INVENTION

In view of this, embodiments of the present application provide a video processing method. The present application further relates to a video processing apparatus, a computing device, a computer-readable storage medium, and a computer program product, so as to solve the technical defects in the prior art that a video uploader adds a link to descriptive information of a video, which requires much time and effort of a user to access content shared by the video uploader during watching of the video, and thus causes a poor user experience.

According to a first aspect of an embodiment of the present application, there is provided a video processing method, the method including:
obtaining a video to be processed;
decoding the video to be processed to obtain a target video frame set, where the target video frame set includes a target recognition image;
determining video position information of the target video frame set in the video to be processed, image position information of the target recognition image in the target video frame set, and a target link corresponding to the target recognition image; and correspondingly storing the video position information, the image position information, and the target link, and binding same to the video to be processed.

According to a second aspect of an embodiment of the present application, there is provided a video processing apparatus, the apparatus including:
an obtaining module configured to obtain a video to be processed;
a decoding module configured to decode the video to be processed to obtain a target video frame set, where the target video frame set includes a target recognition image;
a determination module configured to determine video position information of the target video frame set in the video to be processed, image position information of the target recognition image in the target video frame set, and a target link corresponding to the target recognition image; and
a storage and binding module configured to correspondingly store the video position information, the image position information, and the target link, and bind same to the video to be processed.

According to a third aspect of an embodiment of the present application, there is provided a computing device, including:
a memory and a processor,
where the memory is configured to store computer-executable instructions, and the processor is configured to execute the computer-executable instructions to:
obtain a video to be processed;
decode the video to be processed to obtain a target video frame set, where the target video frame set includes a target recognition image;
determine video position information of the target video frame set in the video to be processed, image position information of the target recognition image in the target video frame set, and a target link corresponding to the target recognition image; and
correspondingly store the video position information, the image position information, and the target link, and bind same to the video to be processed.

According to a fourth aspect of an embodiment of the present application, there is provided a computer-readable storage medium storing computer-executable instructions, where when the computer-executable instructions are executed by a processor, the steps of any of the video processing methods are implemented.

According to a fifth aspect of an embodiment of this specification, there is provided a computer program product, where when executed in a computer, the computer program product causes the computer to execute the steps of the foregoing video processing method.

The video processing method provided in the present application includes: obtaining a video to be processed; decoding the video to be processed to obtain a target video frame set, where the target video frame set includes a target recognition image; determining video position information of the target video frame set in the video to be processed, image position information of the target recognition image in the target video frame set, and a target link corresponding to the target recognition image; and correspondingly storing the video position information, the image position information, and the target link, and binding same to the video to be processed.

According to an embodiment of the present application, in a processing stage after a video is uploaded, a link address corresponding to the target recognition image and position information of the target recognition image in the video are correspondingly stored, such that when the video is played, a user can directly click on the target recognition image in the video, thus directly opening the link address corresponding to the target recognition image without executing a scanning operation. This can better facilitate the user in jumping to content that a video uploader wants to share, simplify a complex process of code scanning, and improve user experience.

DETAILED DESCRIPTION OF EMBODIMENTS

Figure 1:
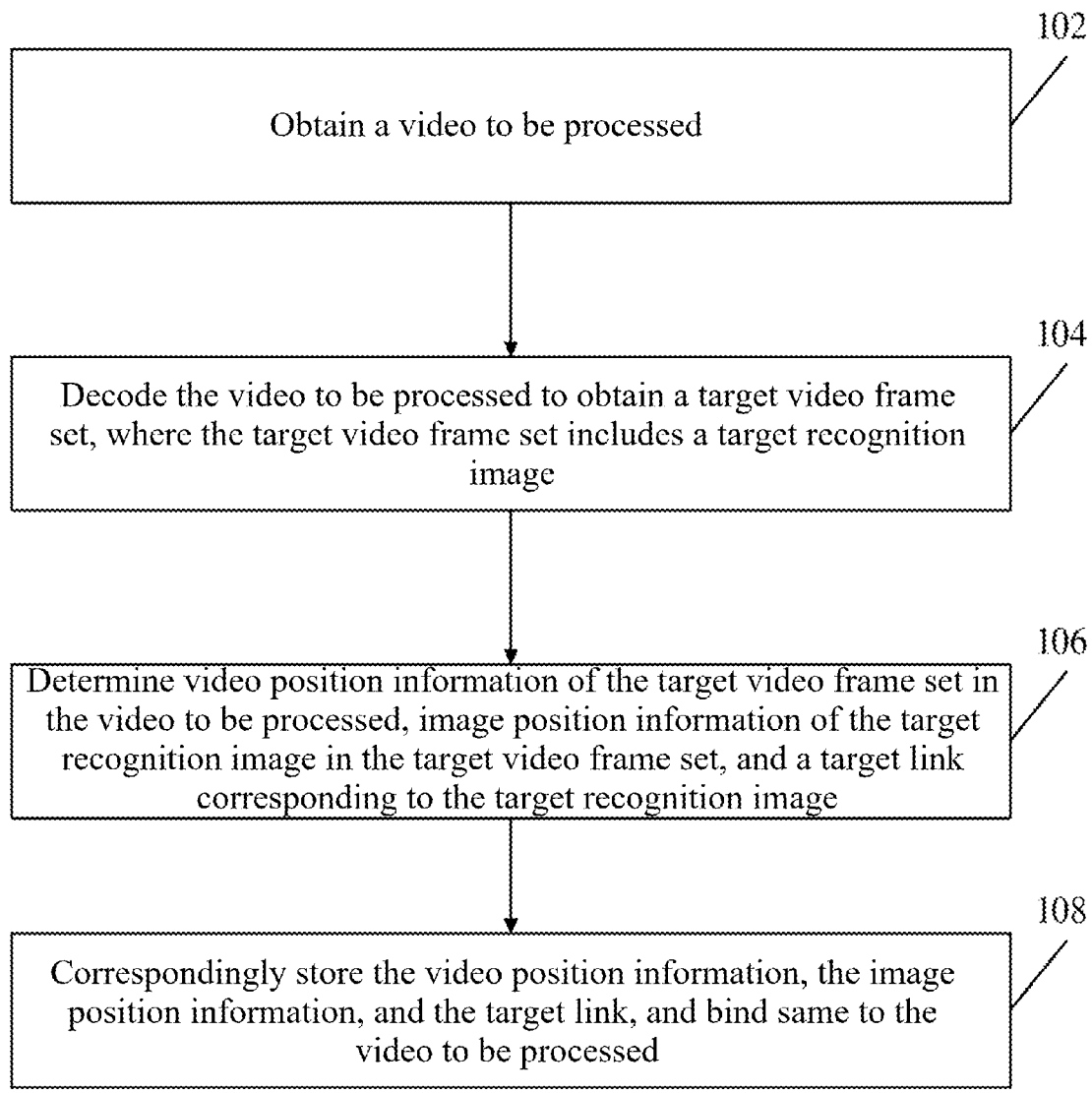
FIG. 1 is a flowchart of a video processing method according to an embodiment of the present application.

In the following description, numerous specific details are set forth to provide a thorough understanding of the present application. However, the present application can be implemented in numerous other ways different from those described herein, and those skilled in the art can make similar extensions without departing from the essence of the present application. Therefore, the present application is not limited by the specific implementations disclosed below.

Terms used in one or more embodiments of the present application are merely for the purpose of describing specific embodiments, and are not intended to limit one or more embodiments of the present application. The terms "a/an", "said", and "the" in the singular form used in one or more embodiments of the present application and the appended claims are also intended to include the plural form, unless otherwise clearly indicated in the context. It should also be understood that the term "and/or" used in one or more embodiments of the present application refers to and includes any or all possible combinations of one or more of the associated listed items.

It should be understood that although the terms "first", "second", etc. may be used in one or more embodiments of the present application to describe various information, the information should not be limited to these terms. These terms are merely used to distinguish the same type of information from one another. For example, without departing from the scope of one or more embodiments of the present application, "first" may also be referred to as "second", and similarly, "second" may also be referred to as "first". Depending on the context, the word "if" as used herein may be interpreted as "when" or "upon" or "in response to determining".

First, the terms used in one or more embodiments of the present application are explained.

Hypertext: It is reticular text for organizing text information in different spaces together. Hypertext is a user interface paradigm for displaying texts and related content between text. Reality hypertext generally exists in the form of an electronic document, and text therein contains a connection to other positions or documents, allowing for direct switching from a current reading position to a position to which a hypertext link is directed. Hypertext takes many forms, in which a hypertext markup language (an application conforming to the standard generalized markup language) and a rich text format are the most commonly used at present.

Hypertext technology: It refers to embedding link information into plain text to make the text interactive to implement text clicking and jumping, thereby connecting all resources on the Internet and thus providing convenience for users.

QR code: A type of two-dimensional bar code. QR is the abbreviation of "Quick Response" in English, which means quick response, and is derived from the inventor expecting content of a QR code to be decoded quickly. The QR code may store more information than a common bar code, and does not need to be aligned directly with a scanner during scanning as with the common bar code.

The present application provides a video processing method, and further relates to a video processing apparatus, a computing device, a computer-readable storage medium, and a computer program product, which are described in detail one by one in the following embodiments.

FIG. 1 is a flowchart of a video processing method according to an embodiment of the present application. The video processing method specifically includes the following steps.

Step 102: A video to be processed is obtained.

The video to be processed is a video uploaded by a video uploader to a video website. After the video is uploaded, the video website needs to perform some processing on the video, such as adding a watermark to the video or adding profile information to the video. For example, a certain video uploader uploads a video to a video website, and the video website needs to perform corresponding processing on the uploaded video, in which case the video is the video to be processed.

In a specific implementation provided in the present application, a video M to be processed uploaded by a video uploader is obtained.

Step 104: The video to be processed is decoded to obtain a target video frame set, where the target video frame set includes a target recognition image.

After the video to be processed is obtained, decoding processing is performed on the video to be processed to obtain each target video frame for the video to be processed, where the target video frame is a video frame including the target recognition image. In actual application, there may be many video frames in one video to be processed, while sometimes, a video uploader may embed a target recognition image in a time period of the video, such that a user may jump to a link address corresponding to the target recognition image by scanning the target recognition image. Based on this, target video frames are video frames including the target recognition image, and are continuous in the video to be processed.

The target recognition image is an image including content that the video uploader wants to share, and the user may access the content by scanning and recognizing the target recognition image. In actual application, the target recognition image includes any one of a two-dimensional code, a bar code, a mini program code, and a QR code, and a specific form of the target recognition image is not limited in the present application, and is subject to the actual application.

Specifically, decoding the video to be processed to obtain a target video frame set, where the target video frame set includes a target recognition image, includes: decoding the video to be processed to generate an initial video frame set; and selecting, from the initial video frame set, video frames including the target recognition image, to generate the target video frame set.

In actual application, the video to be processed is usually decoded first, and the initial video frame set is generated based on all the video frames corresponding to the video to be processed, where the initial video frame set includes a target video frame and a non-target video frame.

After the initial video frame set is obtained, the video frames including the target recognition image are selected from the initial video frame set by means of an image recognition technology, and are then combined together to generate the target video frame set, where the target video frame set is a subset of the initial video frame set.

During specific implementation, there may be an extremely large number of video frames obtained after decoding a video to be processed. For example, a video to be processed is an ultra-high-definition video, with a frame rate of 60 frames, that is, 60 video frames per second, and thus 3,600 video frames per minute. If a duration of the video to be processed is relatively long, a very large number of video frames may be subjected to a relatively slow computing and processing speed, and also imposes a relatively high requirement on a server. Therefore, in order to improve efficiency, decoding the video to be processed includes: decoding the video to be processed at a preset time interval.

To recognize the target recognition image in the video to be processed, when decoding processing is performed on the video, the video to be processed may be decoded at the preset time interval, without at a framing precision of each video frame. For example, the video to be processed can be decoded at a time interval of one frame per second, and thus only 60 video frames need to be decoded per minute, which allows for a significant reduction in the number of video frames and also a higher video processing efficiency compared with a way of fully decoding the video to be processed.

In a specific implementation provided in the present application, still in the above example, the video M to be processed is decoded at a time interval of one second, the video to be processed lasts 360 seconds in total, and 360 video frames are obtained. Then, 60 target video frames are obtained from the 360 video frames by using an image recognition method, where each of the target video frames includes a recognition two-dimensional code.

Step 106: Video position information of the target video frame set in the video to be processed, image position information of the target recognition image in the target video frame set, and a target link corresponding to the target recognition image are determined.

In actual application, the target video frames in the target video frame set are continuous, and the video position information of the target video frame set in the video to be processed is start and end positions of the target video frame in the video to be processed. For example, the target video frame set starts at the 30th second and ends at the 60th second of the video.

The image position information of the target recognition image in the target video frame set is position information of the target recognition image appearing in the target video frame, such as of a certain coordinate area in the target video frame.

The target link corresponding to the target recognition image is link information corresponding to the target recognition image, and the user can jump to an address corresponding to the target link by scanning the target recognition image. In the prior art, the address for the target link is stored in a video introduction.

Specifically, determining video position information of the target video frame set in the video to be processed includes:
determining, as a start time point, a time point of the first target video frame in the target video frame set in the video to be processed;
determining, as an end time point, a time point of the last target video frame in the target video frame set in the video to be processed; and
determining the video position information of the target video frame set in the video to be processed based on the end time point and the start time point.

In actual application, the target video frames are generally continuous, and therefore, the time point corresponding to the first target video frame in the target video frame set can be taken as the start time when the target recognition image appears in the video to be processed, and the time point corresponding to the last target video frame can be taken as the end time when the target recognition image appears in the video to be processed. Therefore, the start time point of the first target video frame in the video to be processed is determined, the end time point of the last target video frame in the video to be processed is determined, and the video position information of the target video frame set in the video to be processed can be determined based on the end time point and the start time point.

In a specific implementation provided in the present application, still in the above example, the video M to be processed includes 60 target video frames, where the first target frame appears at the 60th second of the video to be processed and the last target video frame appears at the 120th second of the video to be processed, and the video position information may then be determined as the 60th to 120th seconds at which the target video frame set appears in the video to be processed.

In another aspect, determining image position information of the target recognition image in the target video frame set includes:
determining a target video frame from the target video frame set; and
determining, as the image position information, coordinate information of the target recognition image in the target video frame.

In actual application, a position of the target recognition image in the video to be processed may be fixed or dynamic, and accordingly, there may be one or more pieces of image position information of the target recognition image. If the position of the target recognition image in the video to be processed is fixed, only image position information of the target recognition image in a certain target video frame needs to be determined. If the position of the target recognition image in the video to be processed is dynamic, image position information of the target recognition image in each target video frame needs to be determined.

Specifically, determining, as the image position information, coordinate information of the target recognition image in the target video frame includes:

when the target recognition image is a rectangle, determining the coordinate information of the target recognition image in the target video frame based on coordinates of any vertex, a length, and a width of the target recognition image; or when the target recognition image is a circle, determining the coordinate information of the target recognition image in the target video frame based on coordinates of a circle center and a radius of the target recognition image; or when the target recognition image is a triangle, determining the coordinate information of the target recognition image in the target video frame based on coordinates of three vertices of the target recognition image.

In actual application, the target recognition image is of various shapes, which may be a regular shape such as a rectangle, a circle, or a triangle, or may be irregular shapes. When the target recognition image is a rectangle, the coordinate information of the target recognition image in the target video frame may be represented based on coordinates of a certain vertex (an upper left vertex, a lower left vertex, an upper right vertex, or a lower right vertex) of the target recognition image and the length and the width of the rectangle. When the target recognition image is a circle, the coordinate information of the target recognition image in the target video frame may be represented based on the coordinates of the circle center and the radius of the target recognition image. When the target recognition image is a triangle, the coordinate information of the target recognition image in the target video frame may be represented based on the coordinates of the three vertices of the target recognition image. When the target recognition image is of an irregular shape, the position of the target recognition image in the target video frame may be represented by coordinates of several points on the target recognition image according to actual situations. In the present application, determining coordinate information of the target recognition image in the target video frame to be the image position information is not limited.

In a specific implementation provided in the present application, still in the above example, the video position information, in the video M to be processed, of the target video frame set in the video to be processed is "the 60th to 120th seconds", the position at which the recognition two-dimensional code appears in the video to be processed is fixed, and the recognition two-dimensional code is a rectangle, and the image position information of the recognition two-dimensional code in the target video frame set is then determined to be $(x_{upper\ left}, y_{upper\ left}, a, b)$, where $(x_{upper\ left}, y_{upper\ left})$ represents coordinates of an upper left vertex of the recognition two-dimensional code, a is the length of the recognition two-dimensional code, and b is the width of the recognized two-dimensional code; and a target link corresponding to the two-dimensional code is obtained, which is a web address that can be accessed through the two-dimensional code.

Step 108: The video position information, the image position information, and the target link are correspondingly stored and bound to the video to be processed.

The video position information, the image position information, and the target link are correspondingly stored and bound to the video to be processed, and can be read when the video is played.

Specifically, correspondingly storing the video position information, the image position information, and the target link, and binding same to the video to be processed include:

correspondingly storing the video position information, the image position information, and the target link in a metadata file; and binding the metadata file to the video to be processed.

Metadata, also called intermediate data or metadata, is data about data, mainly about information of data properties, and is used to support functions of storage position indicating, historical data and resource lookup, file recording, etc. Metadata is an electronic catalog for recording content or characteristics of data and achieving the purpose of assisting in data retrieval.

The video position information, the image position information, and the target link are correspondingly stored in the metadata file, and is then bound to the video to be processed. When the video is played, the metadata file is read, and the time when the target recognition image appears in the video, the position of the target recognition image in the video, and the target link are restored in a link form.

Optionally, the method further includes:

receiving a click instruction of a user and obtaining click position information for the click instruction when the video to be processed is played to the video position information; and obtaining and jumping to the target link when the click position information is consistent with the image position information.

When watching a video, a user may send the click instruction by means of clicking on a screen. In a process of playing the video to be processed, different click instructions correspond to different operations, such as pausing and screen scaling. When the video to be processed is played to the video position information, the click instruction sent by the user is received, and the click position information corresponding to the click instruction needs to be obtained. If the click position is not consistent with the image position information, which indicates that the user clicks on a position outside the target recognition image, a corresponding operation may be directly executed; and if the click position information is consistent with the image position information, which indicates that the user clicks on the target recognition image, the target link bound to the video to be processed is obtained and a jump to the target link is performed.

In actual application, to prevent the user from making accidental operations, before obtaining and jumping to the target link, the method further includes:

sending inquiry information to the user in response to the click instruction, where the inquiry information is used to determine whether to jump to the target link; and obtaining and jumping to the target link when an OK instruction sent by the user based on the inquiry information is received.

In actual application, sometimes the user may make accidental operations and inadvertently click on the target recognition image, and in this case, a direct jump may affect the user experience. Therefore, further inquiry information may be sent to the user before jumping to the target link, to inquire the user whether to jump to the target link. If the user chooses to continue or confirm, the jump to the target link is performed, and if the user chooses to cancel or not to continue, the video continues to be played.

In a specific implementation provided in the present application, still in the above example, the video M to be processed is bound to the video position information "the 60th to 120th seconds", the image position information ($x_{upper\ left}$, $y_{upper\ left}$, a, b), and the target link, i.e., the web address, corresponding to the recognition two-dimensional code.

The user plays the video M, and when the video M is played to a position from the 60th second to the 120th second, the click instruction sent by the user is received, and the click position information ($x_{click}$, $y_{click}$) for the click instruction is obtained. If the click position information ($x_{click}$, $y_{click}$) falls within an area coverage of the image position information ($x_{upper\ left}$, $y_{upper\ left}$, a, b), the target link, i.e., the web address corresponding to the two-dimensional code, is obtained and the jump to the target link is performed.

According to the video processing method provided in the embodiment of the present application, in a processing stage after a video is uploaded, a link address corresponding to the target recognition image and position information of the target recognition image in the video are correspondingly stored, such that when the video is played, a user can directly click on the target recognition image in the video, thus directly opening the link address corresponding to the target recognition image without executing a scanning operation. This can better facilitate the user in jumping to content that a video uploader wants to share, simplify a complex process of code scanning, and improve user experience.

In addition, before the link address is opened, inquiry information is sent to the user to inquire the user whether to open the link, so as to prevent the user from making accidental operations, thereby further improving the usage experience of the user.

Figure 2:
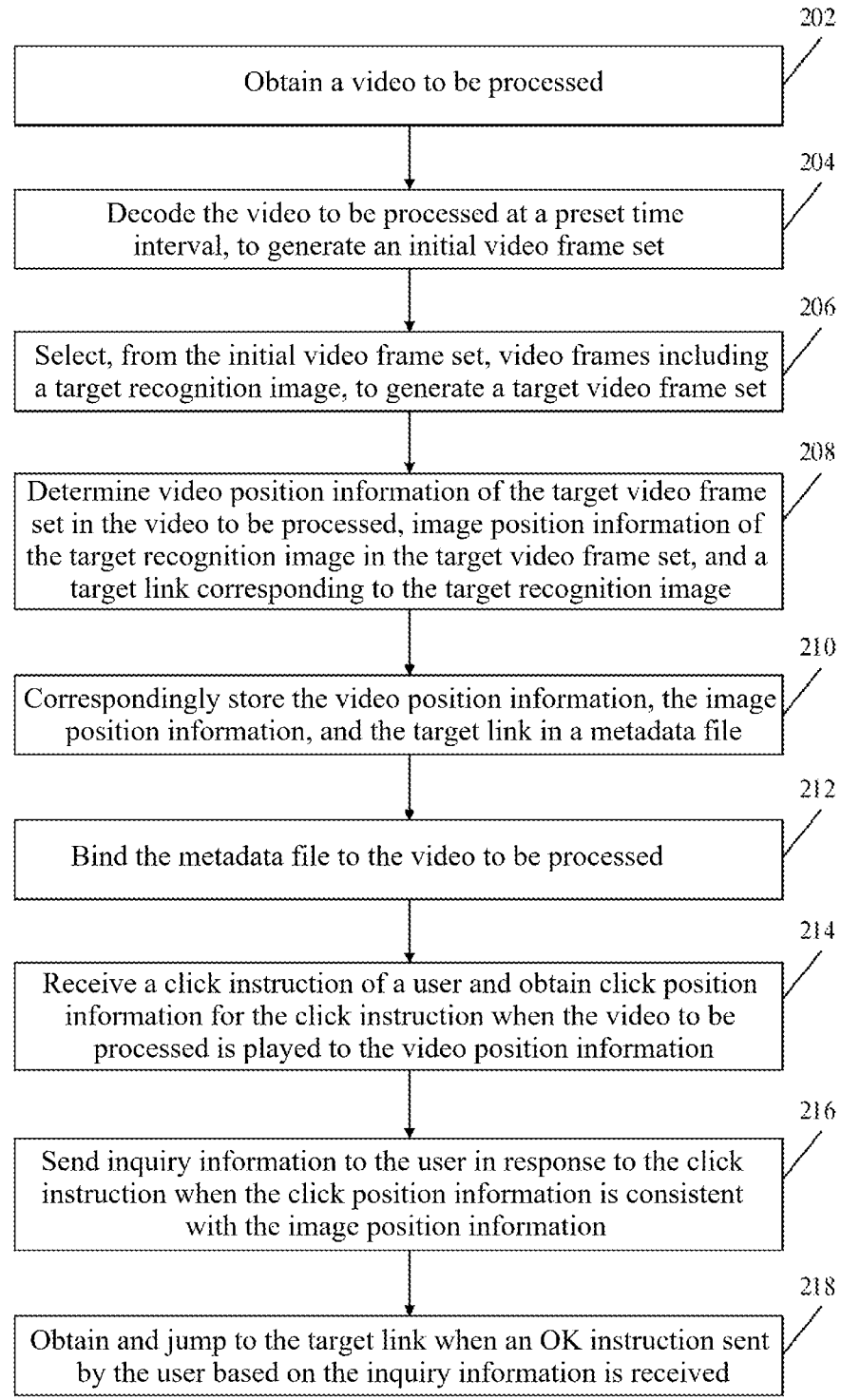
FIG. 2 is a processing flowchart of a video processing method applied to a video website according to an embodiment of the present application.

The video processing method is further described below with reference to FIG. 2 by using an example in which the video processing method provided in the present application is applied to a video website. FIG. 2 is a processing flowchart of a video processing method applied to a video website according to an embodiment of the present application. The method specifically includes the following steps.

Step 202: A video to be processed is obtained.

In the embodiment provided in the present application, a user uploads a video T to a video website B, where the video T is the video to be processed.

Step 204: The video to be processed is decoded at a preset time interval, to generate an initial video frame set.

In the embodiment provided in the present application, the video T to be processed is decoded at a time interval of one second, to obtain the initial video frame set, where there are 600 video frames in total in the initial video frame set.

Step 206: Video frames including a target recognition image are selected from the initial video frame set, to generate a target video frame set.

In the embodiment provided in the present application, the target recognition image is a two-dimensional code. Video frames including the two-dimensional code are selected from the 600 video frames by means of image recognition, to generate a target video frame set, where there are 73 target video frames in the target video frame set and the target video frames are continuous.

Step 208: Video position information of the target video frame set in the video to be processed, image position information of the target recognition image in the target video frame set, and a target link corresponding to the target recognition image are determined.

In the embodiment provided in the present application, it is determined that a time point of the first target video frame in the video T to be processed indicates the $51^{st}$ second, and a time point of the last target video frame in the video T to be processed indicates the $124^{th}$ second In this case, the video position information of the target video frame set in the video to be processed is (the $51^{st}$ to $124^{th}$ seconds).

The two-dimensional code has a fixed position in the video T to be processed, any target video frame is selected from the target video frames, and it is determined that coordinates of a lower left vertex of the two-dimensional code is (50, 550), and that a side length of the two-dimensional code is (100, 100). In this case, the image position information of the target recognition image in the target video frame set is (50, 550, 100, 100).

The target link corresponding to the two-dimensional code is a web address that can be accessed through the two-dimensional code.

Step 210: The video position information, the image position information, and the target link are correspondingly stored in a metadata file.

In the embodiment provided in the present application, the video position information (the $51^{st}$ to $124^{th}$ seconds), the image position information (50, 550, 100, 100), and the target link, i.e., the web address, are correspondingly stored in a metadata file F.

Step 212: The metadata file is bound to the video to be processed.

In the embodiment provided in the present application, the metadata file F is bound to the video T to be processed.

Step 214: A click instruction of a user is received and click position information for the click instruction is obtained when the video to be processed is played to the video position information.

In the embodiment provided in the present application, the video website B publishes the video T, and the user may watch the video T via the video website B. When the video T is played to the $73^{rd}$ second, a click instruction sent by the user by clicking on a screen is received, and click position information of clicking on the screen for the click instruction is also obtained as (73, 600).

Step 216: Inquiry information is sent to the user in response to the click instruction when the click position information is consistent with the image position information.

In the embodiment provided in the present application, after determining that the position indicated by the click position information (73, 600) is consistent with the image position information (50, 550, 100, 100), that is, the user clicks on the two-dimensional code, the inquiry information is sent to the user in response to the click instruction, to inquire the user whether to jump to the target link corresponding to the two-dimensional code.

Step 218: The target link is obtained and a jump to the target link is performed when an OK instruction sent by the user based on the inquiry information is received.

In the embodiment of the present application, when the OK instruction sent by the user based on the inquiry information is received, it is determined that the user wants to jump to the target link corresponding to the two-dimensional code, and then the target link i.e., the web address corresponding to the two-dimensional code, is obtained and the jump to the target link is performed.

According to the video processing method provided in the embodiment of the present application, in a processing stage after a video is uploaded, a link address corresponding to the target recognition image and position information of the target recognition image in the video are correspondingly stored, such that when the video is played, a user can directly click on the target recognition image in the video, thus directly opening the link address corresponding to the target recognition image without executing a scanning operation.

This can better facilitate the user in jumping to content that a video uploader wants to share, simplify a complex process of code scanning, and improve user experience.

In addition, before the link address is opened, inquiry information is sent to the user to inquire the user whether to open the link, so as to prevent the user from making accidental operations, thereby further improving the usage experience of the user.

Figure 3:
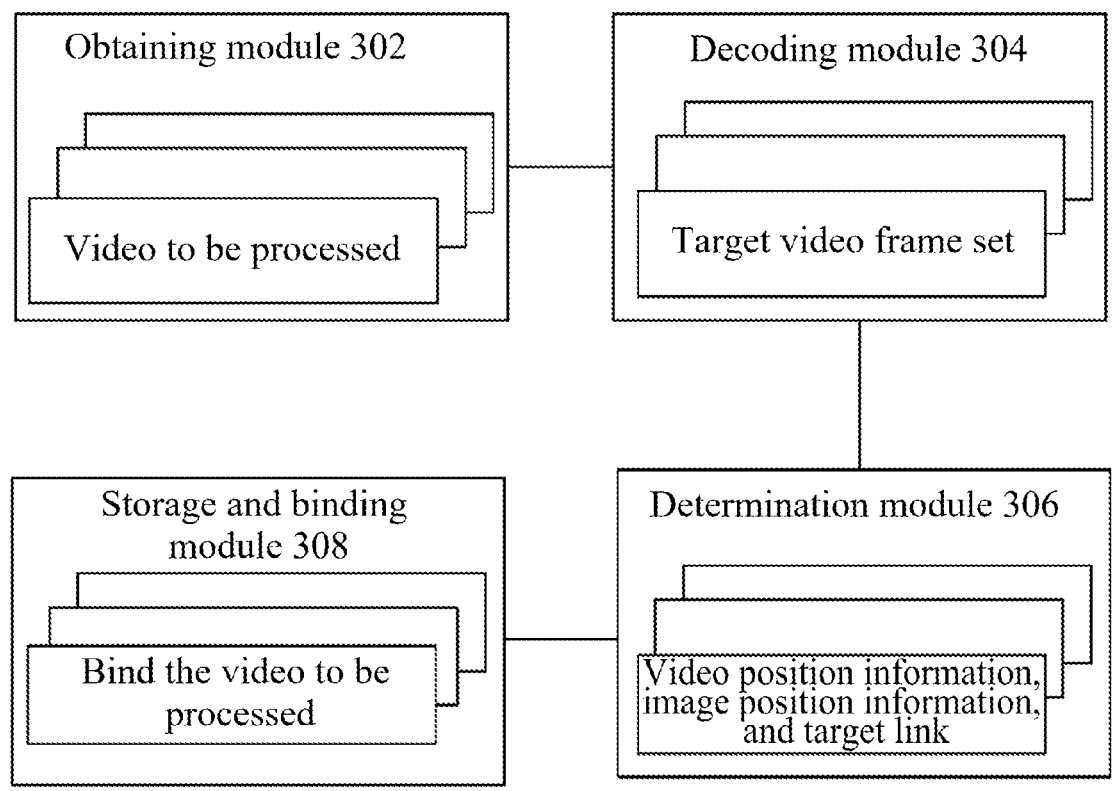
FIG. 3 is a schematic structural diagram of a video processing apparatus according to an embodiment of the present application.

Corresponding to the foregoing method embodiment, the present application further provides an embodiment of a video processing apparatus. FIG. 3 is a schematic structural diagram of a video processing apparatus according to an embodiment of the present application. As shown in FIG. 3, the apparatus includes:

an obtaining module 302 configured to obtain a video to be processed;

a decoding module 304 configured to decode the video to be processed to obtain a target video frame set, wherein the target video frame set comprises a target recognition image;

a determination module 306 configured to determine video position information of the target video frame set in the video to be processed, image position information of the target recognition image in the target video frame set, and a target link corresponding to the target recognition image; and a storage and binding module 308 configured to correspondingly store the video position information, the image position information, and the target link, and bind same to the video to be processed.

Optionally, the decoding module 304 is further configured to:

decode the video to be processed to generate an initial video frame set; and select, from the initial video frame set, video frames including the target recognition image, to generate the target video frame set.

Optionally, the decoding module 304 is further configured to:

decode the video to be processed at a preset time interval.

Optionally, the determination module 306 is further configured to:

determine, as a start time point, a time point of the first target video frame in the target video frame set in the video to be processed;

determine, as an end time point, a time point of the last target video frame in the target video frame set in the video to be processed; and determine the video position information of the target video frame set in the video to be processed based on the end time point and the start time point.

Optionally, the determination module 306 is further configured to:

determine a target video frame from the target video frame set; and determine, as the image position information, coordinate information of the target recognition image in the target video frame.

Optionally, the determination module 306 is further configured to:

when the target recognition image is a rectangle, determine the coordinate information of the target recognition image in the target video frame based on coordinates of any vertex, a length, and a width of the target recognition image; or when the target recognition image is a circle, determine the coordinate information of the target recognition image in the target video frame based on coordinates of a circle center and a radius of the target recognition image; or when the target recognition image is a triangle, determine the coordinate information of the target recognition image in the target video frame based on coordinates of three vertices of the target recognition image.

Optionally, the storage and binding module 308 is further configured to:

correspondingly store the video position information, the image position information, and the target link in a metadata file; and bind the metadata file to the video to be processed.

Optionally, the target recognition image includes any one of a two-dimensional code, a bar code, a mini program code, and a QR code.

Optionally, the apparatus further includes:

a receiving module configured to receive a click instruction of a user and obtain click position information for the click instruction when the video to be processed is played to the video position information; and a jump module configured to obtain and jump to the target link when the click position . . . information is consistent with the image position information.

Optionally, the jump module is further configured to:

send inquiry information to the user in response to the click instruction, where the inquiry information is used to determine whether to jump to the target link; and obtain and jump to the target link when an OK instruction sent by the user based on the inquiry information is received.

According to the video processing apparatus provided in the embodiment of the present application, in a processing stage after a video is uploaded, a link address corresponding to the target recognition image and position information of the target recognition image in the video are correspondingly stored, such that when the video is played, a user can directly click on the target recognition image in the video, thus directly opening the link address corresponding to the target recognition image without executing a scanning operation. This can better facilitate the user in jumping to content that a video uploader wants to share, simplify a complex process of code scanning, and improve user experience.

In addition, before the link address is opened, inquiry information is sent to the user to inquire the user whether to open the link, so as to prevent the user from making accidental operations, thereby further improving the usage experience of the user.

The foregoing description is a schematic solution of the video processing apparatus of this embodiment. It should be noted that the technical solution of the video processing apparatus belongs to the same concept as the technical solution of the foregoing video processing method. For details that are not further described in the technical solution of the video processing apparatus, reference may be made to the description of the technical solution of the foregoing video processing method.

Figure 4:
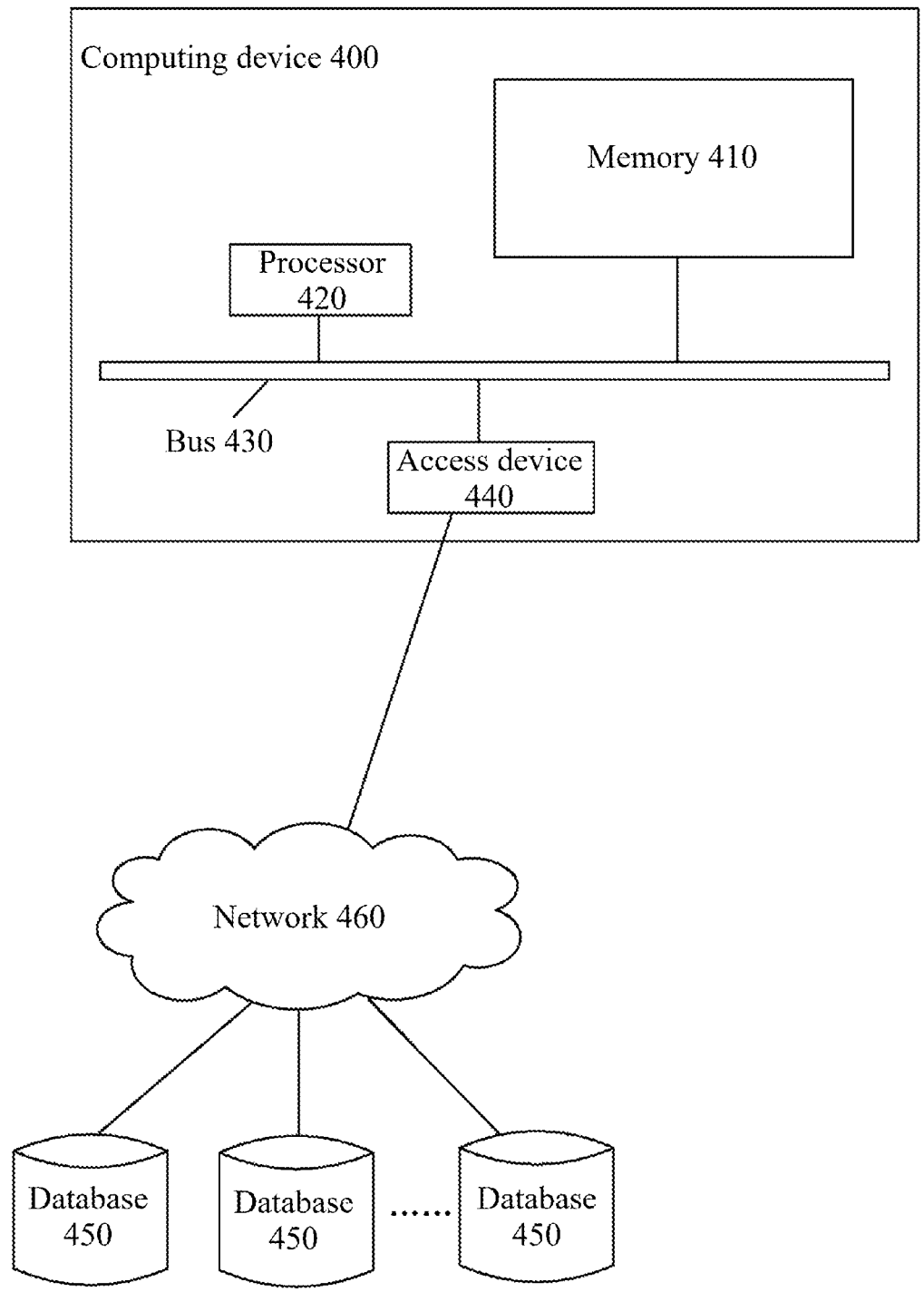
FIG. 4 is a structural block diagram of a computing device according to an embodiment of the present application.

FIG. 4 is a structural block diagram of a computing device 400 according to an embodiment of the present application. Components of the computing device 400 include, but are not limited to, a memory 410 and a processor 420. The processor 420 is connected to the memory 410 through a bus 430, and a database 450 is configured to store data.

The computing device 400 further includes an access device 440. The access device 440 enables communication of the computing device 400 via one or more networks 460.

Examples of the networks include a public switched telephone network (PSTN), a local area network (LAN), a wide area network (WAN), a personal area network (PAN), or a combination of communication networks such as the Internet. The access device 440 may include one or more of any types of wired or wireless network interface (e.g., a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near-field communication (NFC) interface.

In an embodiment of the present application, the foregoing components of the computing device 400 and other components not shown in FIG. 4 may also be connected to each other, e.g., through a bus. It should be understood that the structural block diagram of the computing device shown in FIG. 4 is merely an example, instead of limiting the scope of the present application. Those skilled in the art can add or replace other components as required.

The computing device 400 may be any type of stationary or mobile computing device, including a mobile computer or a mobile computing device (e.g., a tablet computer, a personal digital assistant, a laptop computer, a notebook computer, a netbook, etc.), a mobile phone (e.g., a smartphone), a wearable computing device (e.g., a smart watch, smart glasses, etc.), or other types of mobile devices, or a stationary computing device such as a desktop computer or a PC. The computing device 400 may alternatively be a mobile or stationary server.

The processor 420 is configured to execute the following computer-executable instructions to:
  obtain a video to be processed;
  decode the video to be processed to obtain a target video frame set, where the target video frame set includes a target recognition image;
  determine video position information of the target video frame set in the video to be processed, image position information of the target recognition image in the target video frame set, and a target link corresponding to the target recognition image; and
  correspondingly store the video position information, the image position information, and the target link, and bind same to the video to be processed.

The foregoing description is a schematic solution of the computing device of this embodiment. It should be noted that the technical solution of the computing device belongs to the same concept as the technical solution of the foregoing video processing method. For details that are not further described in the technical solution of the computing device, reference may be made to the description of the technical solution of the foregoing video processing method.

An embodiment of the present application further provides a computer-readable storage medium storing computer instructions, where the instructions are executed by a processor to:
  obtain a video to be processed;
  decode the video to be processed to obtain a target video frame set, where the target video frame set includes a target recognition image;
  determine video position information of the target video frame set in the video to be processed, image position information of the target recognition image in the target video frame set, and a target link corresponding to the target recognition image; and
  correspondingly store the video position information, the image position information, and the target link, and bind same to the video to be processed.

The foregoing description is a schematic solution of the computer-readable storage medium of this embodiment. It should be noted that the technical solution of the storage medium belongs to the same concept as the technical solution of the foregoing video processing method. For details that are not further described in the technical solution of the storage medium, reference may be made to the description of the technical solution of the foregoing video processing method.

An embodiment of this specification further provides a computer program product, where when executed in a computer, the computer program product causes the computer to execute the steps of the foregoing video processing method.

The foregoing description is a schematic solution of the computer program product of this embodiment. It should be noted that the technical solution of the computer program product belongs to the same concept as the technical solution of the foregoing video processing method. For details that are not further described in the technical solution of the computer program product, reference may be made to the description of the technical solution of the foregoing video processing method.

Specific embodiments of the present application are described above. Other embodiments are within the scope of the appended claims. In some cases, the actions or steps recited in the claims can be performed in an order different from that in the embodiments, and can still achieve desired results. In addition, the processes depicted in the figures are not necessarily required to be shown in a particular or sequential order, to achieve desired results. In some implementations, multi-task processing and parallel processing are also possible or may be advantageous.

The computer instructions include computer program product code, which may be in a source code form, an object code form, an executable file form, some intermediate forms, etc. The computer-readable medium may include: any entity or apparatus that can carry the computer program product code, such as a recording medium, a USB flash drive, a removable hard disk, a magnetic disk, an optical disc, a computer memory, a read-only memory (ROM), a random access memory (RAM), an electrical carrier signal, a telecommunications signal, and a software distribution medium. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be noted that, for ease of description, the foregoing method embodiments are described as a series of action combinations. However, persons skilled in the art should understand that the present application is not limited to the described action order, because according to the present application, some steps may be performed in another order or simultaneously. Moreover, those skilled in the art should also understand that the embodiments described in this specification are all preferred embodiments, and the involved actions and modules are not necessarily required by the present application.

In the foregoing embodiments, the embodiments are described with different emphases, and for a part which is not detailed in an embodiment, reference can be made to the related description of the other embodiments.

The preferred embodiments of the present application disclosed above are merely provided to help illustrate the present application. Optional embodiments are not intended to exhaust all details, nor do they limit the invention to only the described specific implementations. Apparently, many modifications and variations may be made in light of the content of the present application. In the present application, these embodiments are selected and specifically described to provide a better explanation of the principles and practical applications of the present application, so that those skilled in the art can well understand and utilize the present application. The present application should be defined only by the claims, and the full scope and equivalents thereof.

What is claimed is:

1. A video processing method, comprising:
    obtaining a video to be processed;
    decoding the video to obtain a set of target video frames, wherein the set of target video frames comprise a target recognition image;
    determining video position information indicating positions of the set of target video frames in the video, determining image position information indicating positions of the target recognition image in the set of target video frames, and determining a target link corresponding to the target recognition image; and
    storing the video position information, the image position information, the target link, and a corresponding relationship among them, and binding the video position information, the image position information, the target link, and the corresponding relationship to the video.

2. The video processing method according to claim 1, wherein the decoding the video to obtain a set of target video frames comprises:
    decoding the video to generate an initial set of video frames; and
    generating the set of target video frames by selecting, from the initial set of video frames, video frames comprising the target recognition image.

3. The video processing method according to claim 2, wherein the decoding the video comprises:
    decoding the video at a preset time interval.

4. The video processing method according to claim 1, wherein the determining video position information indicating positions of the set of target video frames in the video comprises:
    determining, as a start time point, a time point of a first target video frame in the set of target video frames in the video;
    determining, as an end time point, a time point of a last target video frame in the set of target video frames in the video; and
    determining the video position information of the set of target video frames in the video based on the end time point and the start time point.

5. The video processing method according to claim 1, wherein the determining image position information indicating positions of the target recognition image in the set of target video frames comprises:
    determining a target video frame from the set of target video frames; and
    determining coordinate information of the target recognition image in the target video frame as the image position information.

6. The video processing method according to claim 5, wherein the determining coordinate information of the target recognition image in the target video frame as the image position information comprises:
    determining the coordinate information of the target recognition image in the target video frame based on coordinates of any vertex, a length, and a width of the target recognition image when the target recognition image is in a rectangle shape;
    determining the coordinate information of the target recognition image in the target video frame based on coordinates of a circle center and a radius of the target recognition image when the target recognition image is in a circle shape; and
    determining the coordinate information of the target recognition image in the target video frame based on coordinates of three vertices of the target recognition image when the target recognition image is in a triangle shape.

7. The video processing method according to claim 1, wherein the storing the video position information, the image position information, the target link, and a corresponding relationship among them, and binding the video position information, the image position information, the target link, and the corresponding relationship to the video comprise:
    storing the video position information, the image position information, the target link, and the corresponding relationship among them in a metadata file; and
    binding the metadata file to the video.

8. The video processing method according to claim 1, wherein the target recognition image comprises a two-dimensional code, a bar code, a mini program code, and a quick response (QR) code.

9. The video processing method according to claim 1, further comprising:
    receiving a click instruction of a user and obtaining click position information of the click instruction when the video is played to the positions indicated by the video position information; and
    obtaining and jumping to the target link in response to determining that the click position information is consistent with the image position information.

10. The video processing method according to claim 9, wherein before the obtaining and jumping to the target link, the video processing method further comprises:
    sending inquiry information to the user in response to receiving the click instruction, wherein the inquiry information is configured to confirm whether to jump to the target link; and
    obtaining and jumping to the target link in response to receiving a confirmation instruction from the user.

11. A computing device, comprising:
    a memory and a processor, wherein the memory is configured to store computer-executable instructions, and the processor is configured to execute the computer-executable instructions to implement operations comprising:
    obtaining a video to be processed;
    decoding the video to obtain a set of target video frames, wherein the set of target video frames comprise a target recognition image;
    determining video position information indicating positions of the set of target video frames in the video, determining image position information indicating positions of the target recognition image in the set of target video frames, and determining a target link corresponding to the target recognition image; and storing the video position information, the image position information, the target link, and a corresponding relationship among them, and binding the video position information, the image position information, the target link, and the corresponding relationship to the video.

12. The computing device according to claim 11, wherein the determining video position information indicating positions of the set of target video frames in the video comprises:
   determining, as a start time point, a time point of a first target video frame in the set of target video frames in the video;
   determining, as an end time point, a time point of a last target video frame in the set of target video frames in the video; and
   determining the video position information of the set of target video frames in the video based on the end time point and the start time point.

13. The computing device according to claim 11, wherein the determining image position information indicating positions of the target recognition image in the set of target video frames comprises determining coordinate information of the target recognition image in a target video frame among the set of target video frames, and wherein the determining coordinate information of the target recognition image in a target video frame among the set of target video frames further comprises:
   determining the coordinate information of the target recognition image in the target video frame based on coordinates of any vertex, a length, and a width of the target recognition image when the target recognition image is in a rectangle shape;
   determining the coordinate information of the target recognition image in the target video frame based on coordinates of a circle center and a radius of the target recognition image when the target recognition image is in a circle shape; and
   determining the coordinate information of the target recognition image in the target video frame based on coordinates of three vertices of the target recognition image when the target recognition image is in a triangle shape.

14. The computing device according to claim 11, wherein the target recognition image comprises a two-dimensional code, a bar code, a mini program code, and a quick response (QR) code.

15. The computing device according to claim 11, the operations further comprising:
   receiving a click instruction of a user and obtaining click position information of the click instruction when the video is played to the positions indicated by the video position information; and
   obtaining and jumping to the target link in response to determining that the click position information matches the image position information.

16. A non-transitory computer-readable storage medium, storing computer instructions, wherein when the instructions are executed by a processor, the processor implements operations comprising:
   obtaining a video to be processed;
   decoding the video to obtain a set of target video frames, wherein the set of target video frames comprise a target recognition image;
   determining video position information indicating positions of the set of target video frames in the video, determining image position information indicating positions of the target recognition image in the set of target video frames, and determining a target link corresponding to the target recognition image; and
   storing the video position information, the image position information, the target link, and a corresponding relationship among them, and binding the video position information, the image position information, the target link, and the corresponding relationship to the video.

17. The non-transitory computer-readable storage medium according to claim 16, wherein the determining video position information indicating positions of the set of target video frames in the video comprises:
   determining, as a start time point, a time point of a first target video frame in the set of target video frames in the video;
   determining, as an end time point, a time point of a last target video frame in the set of target video frames in the video; and
   determining the video position information of the set of target video frames in the video based on the end time point and the start time point.

18. The non-transitory computer-readable storage medium according to claim 16, wherein the determining image position information indicating positions of the target recognition image in the set of target video frames comprises determining coordinate information of the target recognition image in a target video frame among the set of target video frames, and wherein the determining coordinate information of the target recognition image in a target video frame among the set of target video frames further comprises:
   determining the coordinate information of the target recognition image in the target video frame based on coordinates of any vertex, a length, and a width of the target recognition image when the target recognition image is in a rectangle shape;
   determining the coordinate information of the target recognition image in the target video frame based on coordinates of a circle center and a radius of the target recognition image when the target recognition image is in a circle shape; and
   determining the coordinate information of the target recognition image in the target video frame based on coordinates of three vertices of the target recognition image when the target recognition image is in a triangle shape.

19. The non-transitory computer-readable storage medium according to claim 16, wherein the target recognition image comprises a two-dimensional code, a bar code, a mini program code, and a quick response (QR) code.

20. The non-transitory computer-readable storage medium according to claim 16, the operations further comprising:
   receiving a click instruction of a user and obtaining click position information of the click instruction when the video is played to the positions indicated by the video position information; and
   obtaining and jumping to the target link in response to determining that the click position information matches the image position information.

* * * * *